United States Patent [19]
Holman

[11] 3,743,983
[45] July 3, 1973

[54] FOCUSSING AND DEFLECTING SYSTEM COMPRISING A FERROMAGNETIC WIRE-COIL

[75] Inventor: Benedictus Timotheus Johannes Holman, Emmasingel, Eindhoven, Netherlands

[73] Assignee: U.S. Philips Corporation, New York, N.Y.

[22] Filed: Feb. 8, 1972

[21] Appl. No.: 224,452

[30] Foreign Application Priority Data
Feb. 19, 1971 Netherlands ........................ 7102201

[52] U.S. Cl. ..................... 335/210, 335/213, 313/84
[51] Int. Cl. ................................................ H01f 7/00
[58] Field of Search ............................ 335/210, 213; 313/84; 336/177

[56] References Cited

UNITED STATES PATENTS 3,052,809 9/1962 Bahring et al. ........................ 313/84
3,158,774 11/1964 Fleming et al. ........................ 313/84

FOREIGN PATENTS OR APPLICATIONS 1,095,313 6/1961 Germany ............................ 335/210

*Primary Examiner*—George Harris
*Attorney*—Frank R. Trifari

[57] ABSTRACT

The coil former of an electron-optical system comprising a magnetic focussing device, an electromagnetic deflecting device and a coil former of ferromagnetic wire which is coaxially arranged therebetween, is provided with wire turns such that the interference in the picture signal occurring with systems of this kind is suppressed.

This is achieved, for example, by imparting an opposed winding sense to the winding wire for the coil former for two axial portions, or by providing a plurality of winding layers having opposed winding senses one over the other.

9 Claims, 5 Drawing Figures

FOCUSSING AND DEFLECTING SYSTEM COMPRISING A FERROMAGNETIC WIRE-COIL

The invention relates to an electron-optical system, comprising a magnetic focussing device, an electromagnetic deflecting device and a wire-coil of ferromagnetic material which is arranged between these two devices, particularly suitable for a television camera tube having a target plate to be scanned by an electron beam and a mesh electrode which is situated near the target plate.

A system of this kind is known, for example, from German Pat. specification No. 1,095,313, in which a method is described for eliminating parallelogram distortion of a television frame which is caused inter alia by the wire-coil.

When a system of this kind is used, for example, for a television camera tube having a mesh electrode which is situated near the target plate, interference voltages are found to be present in a picture signal derived from the camera tube.

The invention has for its object to suppress these interference voltages and to this end an electron-optical system of the kind set forth is characterized in that the wire-coil comprises wire turns which suppress an interfering effect of an angular induction produced in the wire-coil by the magnetic focussing device.

When use is made of an electron-optical system having a wire-coil comprising wire turns according to the invention, the interference voltages appear to be substantially reduced, if not eliminated.

In a preferred embodiment of an electron-optical system according to the invention, the winding sense of the wire-coil is mutually opposed over two longitudinal portions. In a further preferred embodiment according to the invention, electrically conducting, magnetically neutral metal wire turns are toroidally provided about a known wire-coil.

Figure 1:
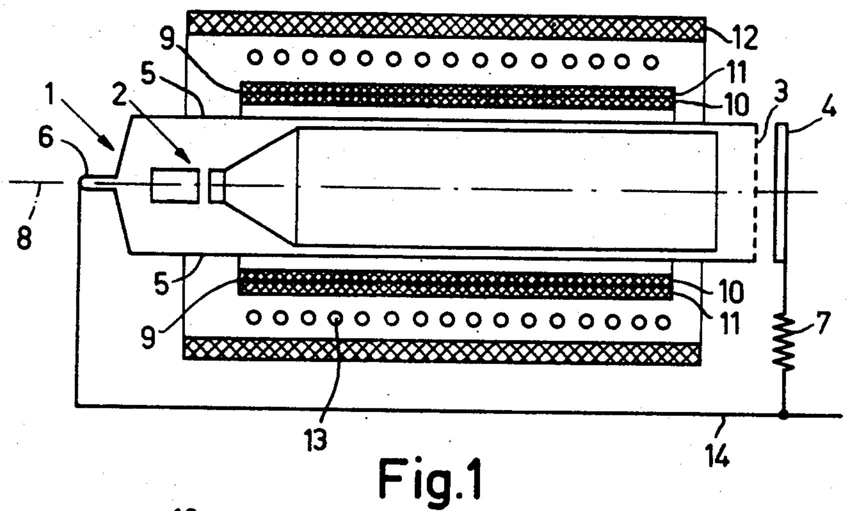
Figure 2:
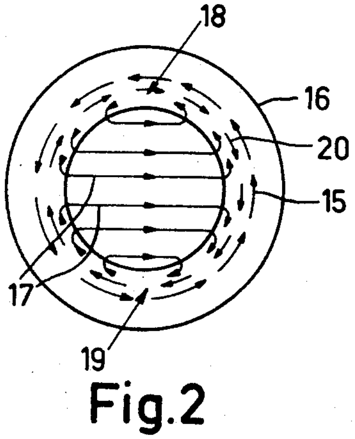
Figure 3:
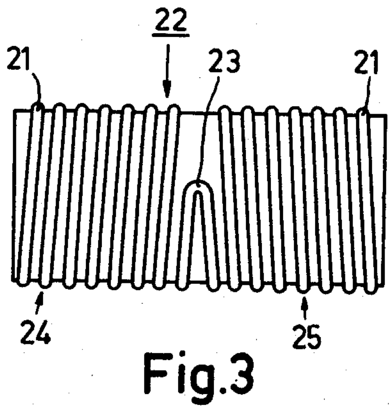
Figure 4:
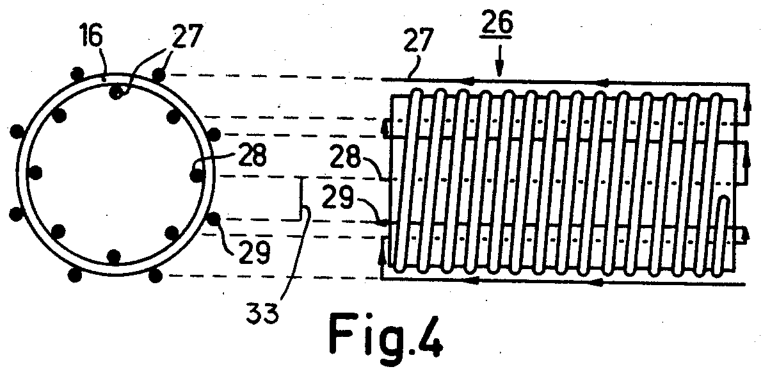
Figure 5:
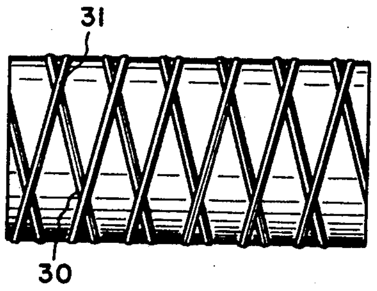

In order that the invention may be readily carried into effect, some embodiments thereof will now be described in detail, by way of example, with reference to the accompanying diagrammatic drawing, in which:

FIG. 1 is a diagrammatic view of a television camera tube provided with an electron-optical system, FIG. 2 is a longitudinal sectional view of a ferromagnetic metal wire-coil, FIG. 3 shows a wire-coil composed of a single layer of turns, the winding sense of two portions being mutually opposed according to the invention, FIG. 4 shows a wire-coil provided with additive, magnetically neutral metal wire turns according to the invention, toroidally wound about the wire-coil, and FIG. 5 shows another embodiment of the coil having two oppositely wound layers.

The arrangement shown in FIG. 1 comprises a television camera tube 1 of the Vidicon type, having an electron gun 2, a mesh electrode 3 and a target plate 4. The mesh electrode 3 is connected to a feed-through pin 6 of the camera tube via a connecting wire 5, preferably a double wire in view of symmetry, or via an anode bush supporting the mesh electrode, and is further galvanically coupled to the target plate 4 via a connection lead 14 and a signal resistor 7. Symmetrically arranged about an electron-optical axis of the television camera tube are an electromagnetic deflecting device 9, consisting of a line deflecting coil 10 and a field deflecting coil 11 which has been rotated through 90° with respect thereto, a magnetic focussing device, in this case consisting of a focussing coil 12, and a wire-coil 13 which is mounted between the focussing device and the deflecting device. The wire-coil has the function of amplifying the deflecting fields of the deflecting coils, and to this end it is made of ferromagnetic material such as, for example, mu-metal or Armco iron. A hollow cylinder of this material may not be used for this purpose because the focussing field in the television camera tube would then be excessively attenuated.

So as to obtain an insight into the generation of interference signals in this arrangement, attention is to be paid, on the one hand, to the electrically conducting loop which is formed by the double connecting wire 5, which for the effects involved in this situation may be assumed to be a single wire coinciding with the optical axis 8, the connecting lead 14 and the signal resistor 7. In this loop a capacitor is formed by the mesh electrode 3 and the target plate 4. On the other hand, as is shown in FIG. 2, an induction field 15 is generated in the wire 16 of the wire-coil by the axially-directed magnetic field of the focussing device. This induction field 15 is produced in that the wire of the wire-coil has a given winding pitch in the direction of the focussing field. The direction of the induction field 15, varying angularly with respect to the electron-optical axis 8, is determined by the field-strength direction of the focussing field and the winding sense of the wire of the wire-coil. As the focussing field in a television camera tube has a constant value, apart from any small corrections, the induction field 15 will also have a substantially constant value and hence it will not cause an interfering voltage within the said loop.

In FIG. 2, in which the wire 16 is drawn too thick in relation to the wire-coil diameter, the arrows 17 denote a magnetic deflecting field of the electromagnetic deflecting device. This magnetic field is symmetrically distributed over two magnetic return paths 18 and 19 through the wire 16. This symmetry is disturbed when the ferromagnetic material of the wire 16 has an induction-dependent permeability. This is always the case with the materials commonly used for the wire-coil, in a sense such that the permeability decreases as the induction increases. In the present case the portion of the deflecting field 17 following the path 19 will be larger than the portion following the path 18, because the deflecting induction field 17 and the focusing induction field 15 are oppositely directed over the path 19, and have the same direction over the path 18. This asymmetrical distribution of the deflecting field is equivalent to a symmetrically-distributed deflecting field on which an induction field 20 is superimposed, the value of the induction field 20 being substantially independent of the location on the wire-coil, and the direction of the induction field 20 being opposed to the direction of the induction field 15 which, as has been demonstrated, causes the induction field 20. The induction field 20 varies with the deflecting field during operation of the tube, thus forming an interference field within the said loop. This alternating field causes an interference voltage across the capacitor formed by the mesh electrode and the target plate; the value of this interference voltage will be highest during the line-flyback time as the deflecting field then varies the quickest. This interference voltage causes interference pulses in the picture signal which is derived from the target plate. Moreover, a black level, which is fixed during the line-flyback time, will vary over the screen in the upward direction due to the occurrence of these interference signals as a result of an amplitude modulation of the interference signals by the field deflecting field. The object of each of the preferred embodiments of electron-optical systems according to the invention to be described hereinafter is to reduce the consequences of the induction field 20 by means of an advantageous construction of the wire-coil.

In one preferred embodiment a ferromagnetic metal wire 21 is wound to form a wire-coil 22 according to the method shown in FIG. 3. In this Figure the wire has a turning point 23 so that the winding senses of two portions 24 and 25 of the wire-coil 22 are mutually opposed. A better connection of the two portions 24 and 25 is obtained by interrupting the wire at the turning point and by continuing the winding on an opposite side of the wire-coil, i.e. 180° further, in an opposed winding sense. The turning point must coincide with the centre of the deflecting field, such as shown in FIG. 4 as conductive strap 33 viewed in the axial direction, when using a uniform winding pitch in these embodiments. If so desired for technical reasons, the effective centre of the wire-coil can be arranged to be outside the geometrical centre by introducing a difference in the winding pitch for both portions. The action of the interference field in the first portion 24 of the wire-coil is compensated for in this embodiment by the action of the interference field in the second portion 25 of the wire-coil.

A further preferred embodiment of a wire-coil according to the invention, shown in FIG. 5, is composed of a plurality, preferably an even number, of ferromagnetic wire layers 30 and 31 which are wound one over the other in opposed winding senses. In this embodiment the interference field is locally eliminated over the entire length of the wire-coil.

In a preferred embodiment as shown in FIG. 4, the induction field 15 is compensated for by a winding of a magnetically neutral, electrically conducting metal wire 27 which is toroidally provided about the cylinder jacket of a known wire-coil 26, the said winding consisting, for example, of thin copper wire. The direction and the intensity of an electric direct current applied to this metal wire via ends 28 and 29 can be adjusted such that a resultant angular induction in the coil former 26 just compensates for the induction field 15 generated by the focussing field, so that the induction field 20 is not produced.

In an electrically short-circuited toroidal winding, the induction field 20 itself will produce a compensating alternating current so that also in the case of a short-circuited torus, i.e. without external current supply, compensation occurs, be it that it is not perfect. It was found that proper interference suppression can be realized by means of a torus consisting of approximately 10 turns.

The invention is particularly suitable for use in coil systems for television camera tubes of the Vidicon type because in camera tubes of this kind the mesh electrode and the target plate produce a capacitive coupling having a comparatively large capacitance, but the invention is not restricted to this type of camera tube as similar interference voltages occur also at smaller capacitances.

What is claimed is:

1. A device comprising means for magnetically focusing an electron beam, means for electromagnetically deflecting said beam having a deflecting field having an axial center and means for suppressing magnetic induction interference comprising a ferromagnetic coil disposed between said focusing and deflecting means and having two oppositely wound portions defining a winding sense turning point.

2. A device as claimed in claim 1 wherein said portions are uniformly wound and said turning point is aligned with said axial center.

3. A device as claimed in claim 1 wherein portions together comprise a continuous wire folded back at said turning point.

4. A device as claimed in claim 1 each of said portions comprise an end at said turning point, said ends being diametrically opposed with respect to each other.

5. A device comprising means for magnetically focusing an electron beam; means for electromagnetically deflecting said beam; and means for suppressing magnetic induction inteference comprising a jacket disposed between said focusing and deflecting means, a ferromagnetic first coil wound on said jacket and having a continuous winding sense, and a magnetically neutral electrically conducting second coil toroidally wound about said jacket.

6. A device as claimed in claim 5 wherein said second coil comprises supply and output leads.

7. A device as claimed in claim 5 further comprising means for short circuiting said second coil.

8. A device comprising means for magnetically focusing an electron beam; means for electromagnetically deflecting said beam; and means disposed between said focusing and deflecting means for suppressing magnetic induction interference comprising a plurality ferromagnetic windings disposed one about the other, each of said windings having a winding sense opposite with respect to the widning sense of the adjacent windings.

9. A device as claimed in claim 8 wherein said plurality is even in number.

* * * * *